US010781916B2

(12) United States Patent
Hawley et al.

(10) Patent No.: US 10,781,916 B2
(45) Date of Patent: Sep. 22, 2020

(54) SYSTEM AND METHOD FOR CONTROLLING ENGINE BRAKING (71) Applicant: Toyota Motor Engineering & Manufacturing North America, Inc., Plano, TX (US)

(72) Inventors: Thomas S. Hawley, Ann Arbor, MI (US); Craig D. Herring, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 38 days.

(21) Appl. No.: 15/929,058

(22) Filed: Nov. 6, 2018

(65) Prior Publication Data

US 2020/0141486 A1    May 7, 2020

(51) Int. Cl.
| *F16H 61/21*  | (2006.01) |
| *B60W 30/18*  | (2012.01) |
| *B60W 10/10*  | (2012.01) |
| *B60W 10/04*  | (2006.01) |
| *B60W 10/18*  | (2012.01) |
| *F16H 61/02*  | (2006.01) |
| *B60W 40/105* | (2012.01) |
| *F16H 59/66*  | (2006.01) |
| *B60W 40/076* | (2012.01) |

(52) U.S. Cl.
CPC ....... *F16H 61/21* (2013.01); *B60W 30/18136* (2013.01); *B60W 10/04* (2013.01); *B60W 10/10* (2013.01); *B60W 10/18* (2013.01); *B60W 40/076* (2013.01); *B60W 40/105* (2013.01); *B60W 2510/069* (2013.01); *B60W 2552/15* (2020.02); *B60W 2710/18* (2013.01); *F16H 2059/663* (2013.01); *F16H 2061/0237* (2013.01)

(58) Field of Classification Search
CPC ...... B60W 10/04; B60W 10/10; B60W 10/18; B60W 2510/069; B60W 2520/10; B60W 2550/142; B60W 2710/1005
See application file for complete search history.

(56) References Cited

U.S. PATENT DOCUMENTS

| 6,212,458 B1 | 4/2001 | Walenty et al. |
| 6,625,535 B2 | 9/2003 | Han et al. |
| 7,670,259 B2 * | 3/2010 | Mitchell ................ B60W 10/11 477/118 |

(Continued)

*Primary Examiner* — David R Morris
(74) *Attorney, Agent, or Firm* — Christopher G. Darrow; Darrow Mustafa PC (57) ABSTRACT A method for controlling engine braking includes determining an amount of brake pressure being applied by a vehicle traveling on a road. The method includes determining a current velocity of the vehicle, wherein a transmission of the vehicle is operating using a first gear of a plurality of gears. The method includes, according to the amount of brake pressure and the current velocity of the vehicle, determining a road grade threshold for a second gear of the plurality of gears. The method includes determining a grade of the road. The method includes determining that the determined grade of the road satisfies the road grade threshold for the second gear of the vehicle. The method includes, in response to the determination, causing the transmission of the vehicle to operate in the second gear of the plurality of gears.

20 Claims, 7 Drawing Sheets (56) References Cited

U.S. PATENT DOCUMENTS

| | | | |
|---|---|---|---|
| 7,853,385 B2* | 12/2010 | Ly | F16H 61/21 |
| | | | 180/337 |
| 9,676,388 B2* | 6/2017 | Gauthier | B60W 30/18136 |
| 10,065,641 B2* | 9/2018 | Fraser | B60W 50/0097 |
| 10,336,311 B2* | 7/2019 | Omran | B60W 30/18072 |
| 2003/0036839 A1* | 2/2003 | Han | B60T 8/18 |
| | | | 701/70 |
| 2008/0167161 A1 | 7/2008 | Mitchell et al. | |
| 2009/0043463 A1 | 2/2009 | Ly | |
| 2016/0264122 A1 | 9/2016 | Gauthier | |

\* cited by examiner

SYSTEM AND METHOD FOR CONTROLLING ENGINE BRAKING

TECHNICAL FIELD

The subject matter described herein relates, in general, to a system and method for downshifting to increase engine braking, and in particular, to measuring brake pressure, vehicle velocity, and road grade and determining when to downshift according to the measurements.

BACKGROUND

Engine braking is a way to slow a vehicle using the engine, rather than the conventional wheel-based braking system of the car. When a driver of a vehicle removes their foot from the accelerator, engine braking due to the compression and friction of the engine components slows the vehicle. Engine braking can be increased by shifting the vehicle transmission into a lower gear.

Modern automatic transmissions typically control engine braking based on the driver's use of the vehicle brakes. For example, if the driver applies their foot to the brake pedal for more than a threshold amount of time, the transmission may automatically shift to a lower gear (i.e., a gear with a lower gear ratio) to increase engine braking. When the driver later applies their foot to the accelerator pedal for more than a threshold amount of time, the transmission may automatically shift to a higher gear to reduce engine braking (i.e., a gear with a higher gear ratio).

However, there are some disadvantages associated with the engine braking systems described above. For example, such systems cannot account for variables such as a current road grade, mass of the vehicle, or the amount of brake pressure being applied by the driver of the vehicle. Failure to account for these variables may result in either excessive engine braking or insufficient engine braking. Excessive engine braking may cause the vehicle to slow more than the driver of the vehicle had anticipated, while insufficient engine braking may cause the driver to rely on vehicle brakes for additional braking.

SUMMARY

In one embodiment, example systems and methods relate to controlling engine braking in a vehicle. As a vehicle travels on a road, an engine braking system monitors the brake pressure, velocity, and mass of the vehicle to determine a road grade threshold for each gear of a transmission. When a grade of the road exceeds the road grade threshold for a gear, the vehicle downshifts to the gear associated with the threshold to increase engine braking. The vehicle, in one approach, determines the road grade thresholds using the vehicle mass, brake pressure, and velocity such that the increase in engine braking in combination with existing brake pressure will result in the velocity of the vehicle remaining constant while subject to the grade of the road.

Later, when the grade of the road is reduced and no longer exceeds the threshold or throttle is applied to the vehicle, the vehicle waits until a timer is exceeded before upshifting to reduce engine braking. The vehicle may dynamically calculate the timer according to the current road grade or a current engine velocity.

In one embodiment, an engine braking system for controlling engine braking is disclosed. The engine braking system includes one or more processors and a memory communicably coupled to the one or more processors. The memory stores a vehicle monitoring module including instructions that when executed by the one or more processors cause the one or more processors to: determine an amount of brake pressure being applied by a vehicle traveling on a road; determine a current velocity of the vehicle, wherein a transmission of the vehicle is operating using a first gear of a plurality of gears; and determine a grade of the road. The memory further stores a downshift module including instructions that when executed by the one or more processors cause the one or more processors to: according to the amount of brake pressure and the current velocity of the vehicle, determine a grade threshold for a second gear of the plurality of gears; and in response to a determination that the determined grade of the road satisfies the grade threshold for the second gear of the vehicle, generate a control signal to cause the transmission of the vehicle to operate using the second gear of the plurality of gears.

In one embodiment, a method for controlling engine braking is disclosed. The method includes determining an amount of brake pressure being applied by a vehicle traveling on a road. The method includes determining a current velocity of the vehicle, wherein a transmission of the vehicle is operating using a first gear of a plurality of gears. The method includes, according to the amount of brake pressure and the current velocity of the vehicle, determining a grade threshold for a second gear of the plurality of gears. The method includes determining a grade of the road. The method includes, in response to a determination that the determined grade of the road satisfies the road grade threshold for the second gear of the vehicle, generating a control signal to cause the transmission of the vehicle to operate in the second gear of the plurality of gears.

In one embodiment, a non-transitory computer-readable medium for controlling engine braking is disclosed. The non-transitory computer-readable medium includes instructions that when executed by one or more processors cause the one or more processors to perform one or more functions. The instructions include instructions to determine an amount of brake pressure being applied by a vehicle traveling on a road. The instructions include instructions to, according to the amount of brake pressure and the current velocity of the vehicle, determine a road grade threshold for a second gear of the plurality of gears. The instructions include instructions to determine a grade of the road. The instructions include instructions to, in response to a determination that the determined grade of the road satisfies the road grade threshold for the second gear of the vehicle, generate a control signal to cause the transmission of the vehicle to operate in the second gear of the plurality of gears.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with controlling engine braking in a vehicle are disclosed. As described previously, a vehicle can use engine braking to slow the vehicle. Engine braking may be used in addition to, or in place of, the traditional wheel-based braking system.

Typically, when a driver of the vehicle desires to use engine braking they downshift the vehicle transmission into a lower gear which increases engine braking. The driver may continue to downshift until a desired level of engine braking is achieved.

In vehicles with automatic transmissions, the driver of the vehicle cannot downshift, and the vehicle must therefore infer when the driver wants to use engine braking. Previous solutions used the actuation of the brake pedal as a signal to engage engine braking. However, this may result in both excessive engine braking and inefficient engine braking.

In order to improve engine braking for automatic transmissions, the system described herein uses brake pressure, vehicle velocity, and road grade as signals to determine when to increase engine braking (i.e., downshift). In one embodiment, the system monitors the brake pressure currently being applied by the vehicle and the velocity of the vehicle. The system uses the current brake pressure and velocity to determine a grade threshold for the vehicle. The system determines the road grade of the road, and if the road grade is greater than the determined grade threshold, the system causes the vehicle to downshift to a lower gear (i.e., increases engine braking). In general, the greater the brake pressure and the greater the velocity of the vehicle the lower the grade threshold. Similarly, the lower the brake pressure and the lower the velocity of the vehicle, the higher the grade threshold. The grade threshold determined for a gear given a measured brake pressure and vehicle velocity may ensure that the velocity of the vehicle remains constant due to increased engine braking. As will be described further below, in some embodiments, the system also uses the mass of the vehicle when determining the grade threshold.

The system, in further embodiments, considers road grade, vehicle accelerator actuation, and engine speed when determining to reduce engine braking. In one embodiment, the system determines a road grade and an engine speed. The system uses the determined engine speed and road grade to dynamically calculate a value for a timer. When the throttle of the vehicle is later engaged (e.g., the accelerator pedal is pressed), the system determines if the throttle was engaged for an amount of time that is greater than the timer. If it is, the system causes the vehicle to upshift to a higher gear (i.e., decrease engine braking). As will be described further below, the system may further decrease engine braking when the road grade falls below a road grade threshold for an amount of time that is greater than the timer.

The system for controlling engine braking described above provides several advantages over previous engine braking systems. First, determining when to downshift according to the vehicle velocity, brake pressure, and road grade as described herein avoids both excessive and insufficient engine braking by maintaining the velocity of the vehicle after downshifting. Second, by restricting upshifting using a dynamically calculated timer, the system avoids prematurely upshifting due to small or temporary change in road grade and avoids excessive engine speeds due to sudden and dramatic changes in road grade.

Figure 1:
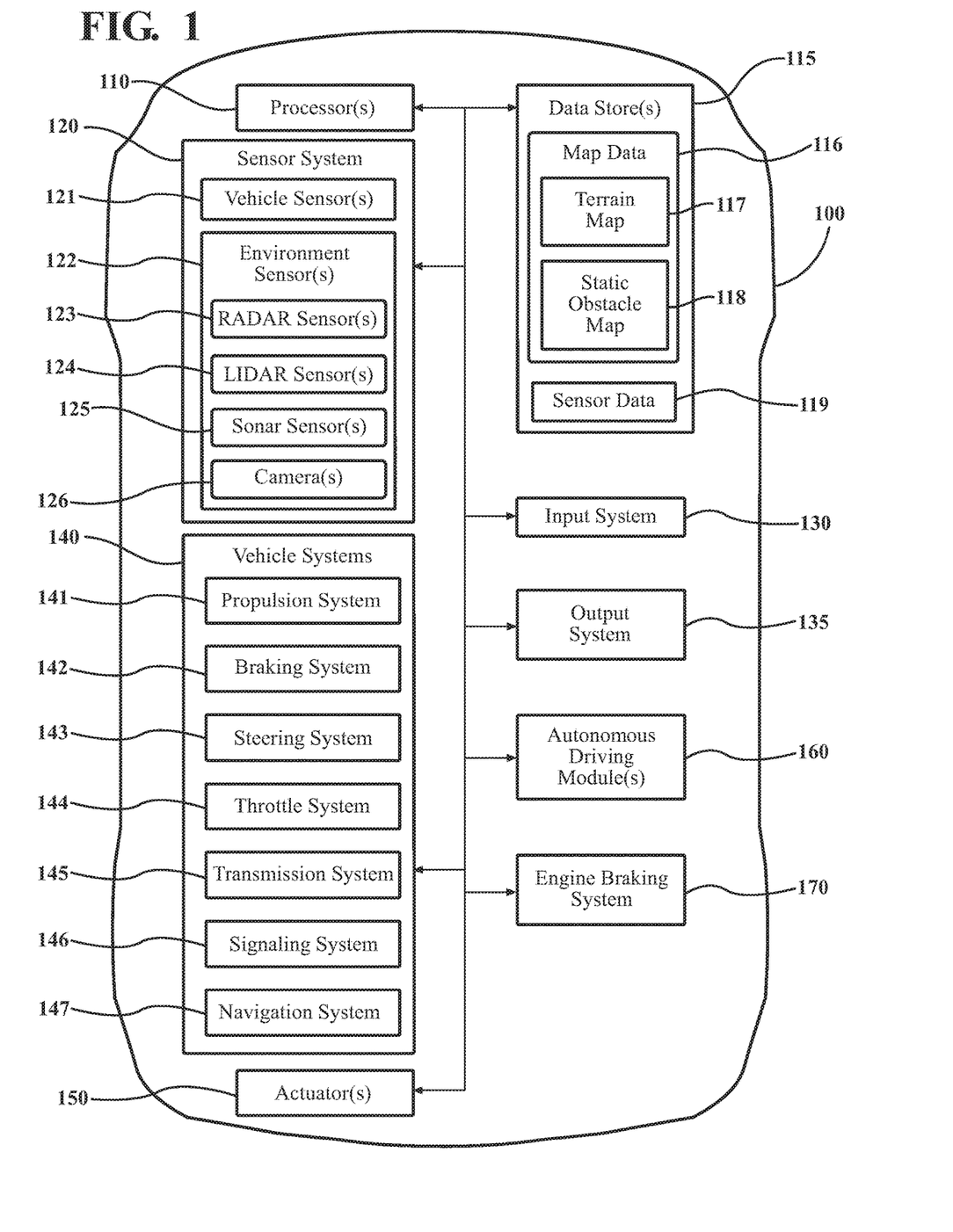
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more embodiments, the vehicle 100 is an automobile. While arrangements will be described herein with respect to automobiles, it will be understood that embodiments are not limited to automobiles. In some embodiments, the vehicle 100 may be any robotic device or form of motorized transport that, for example, includes one or more autonomous driving modes or semi-autonomous driving modes. In other embodiments, the vehicle 100 may be manually controlled by a driver or user.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an engine braking system 170 that is implemented to perform methods and other functions as disclosed herein relating to controlling engine braking for the vehicle 100. The noted functions and methods will become more apparent with a further discussion of the figures.

Figure 2:
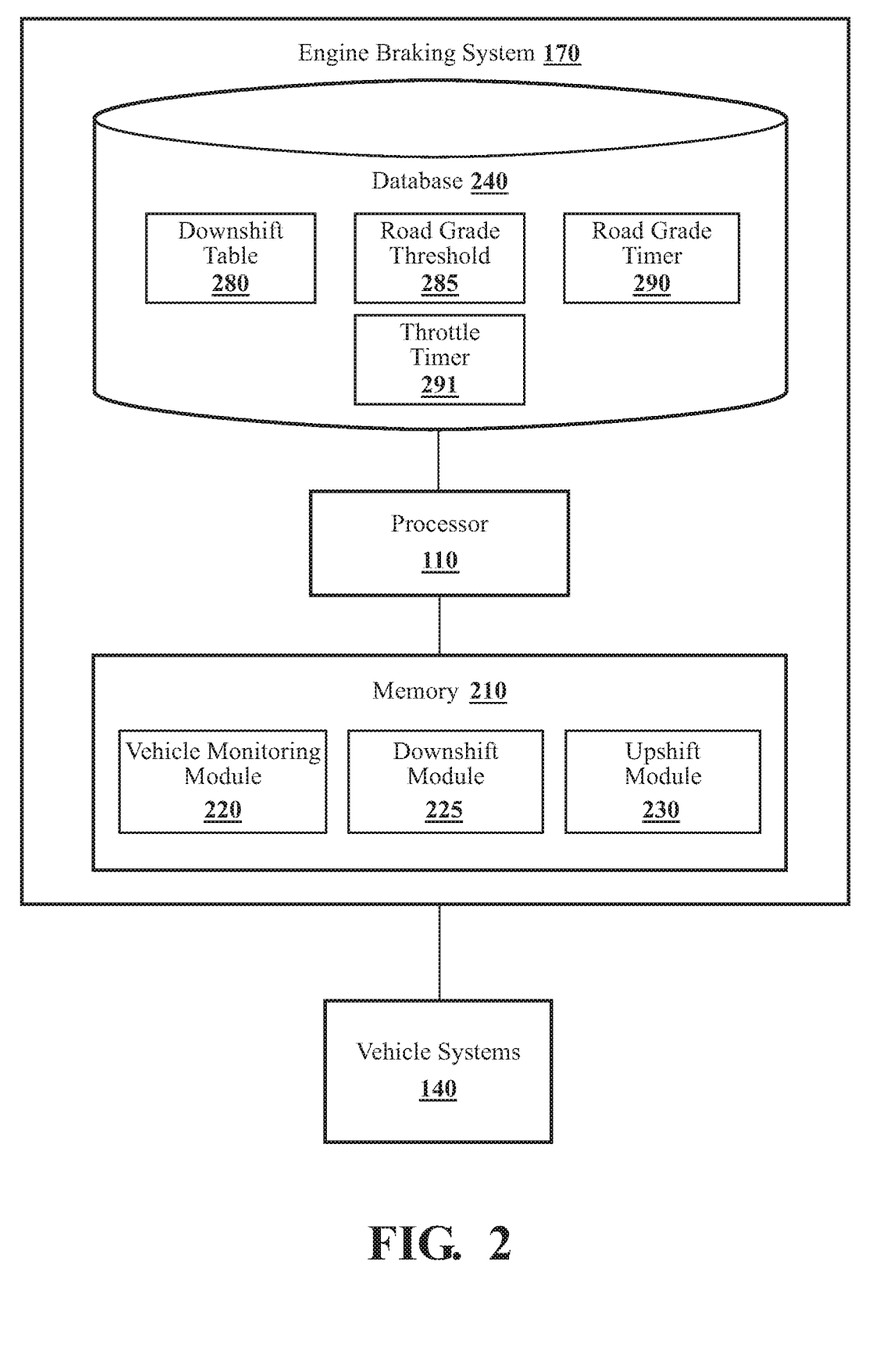
FIG. 2 illustrates one embodiment of an engine braking system.

With reference to FIG. 2, one embodiment of the engine braking system 170 of FIG. 1 is further illustrated. The engine braking system 170 is shown as including a processor 110 from the vehicle 100 of FIG. 1. Accordingly, the processor 110 may be a part of the engine braking system 170, the engine braking system 170 may include a separate processor from the processor 110 of the vehicle 100 or the engine braking system 170 may access the processor 110 through a data bus or another communication path.

In one embodiment, the engine braking system 170 includes a memory 210 that stores a vehicle monitoring module 220, a downshift module 225, and an upshift module 230. The memory 210 is a random-access memory (RAM), read-only memory (ROM), a hard-disk drive, a flash memory, or other suitable memory for storing the modules 220, 225, and 230. The modules 220, 225, and 230 are, for example, computer-readable instructions that when executed by the processor 110 cause the processor 110 to perform the various functions disclosed herein.

Furthermore, in one embodiment, the engine braking system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, and 230 in executing various functions. In one embodiment, the database 240 includes a downshift table 280 along with, for example, other information that is used by the modules 220, 230, and 235 such as a road grade threshold 285, a road grade timer 290, and a throttle timer 291. Of course, in further embodiments, the downshift table 280, road grade threshold 285, road grade timer 290, and throttle timer 291 are stored within the memory 210 or another suitable location.

The vehicle monitoring module 220 is configured to monitor the current brake pressure of the vehicle 100. The brake pressure of the vehicle 100 may be a measure of the force that is currently being applied to a brake pedal by a driver of the vehicle 100. In embodiments where the vehicle 100 is an autonomous vehicle, the brake pressure may be a measure of a level of braking currently being applied by the autonomous driving module(s) 160 associated with the vehicle 100. The vehicle monitoring module 220 may determine the current brake pressure of the vehicle 100 by querying or requesting the brake pressure from the braking system 142 of the vehicle systems 140. Other methods for determining the current brake pressure of a vehicle 100 may be used.

The vehicle monitoring module 220 is configured to monitor the current velocity of the vehicle 100. The vehicle monitoring module 220 may determine the current velocity of the vehicle 100 by querying or requesting the velocity from the throttle system 144 of the vehicle systems 140 and/or the navigation system 147. Other methods for determining the current velocity of a vehicle 100 may be used.

The vehicle monitoring module 220 is configured to monitor the grade of a road currently being traveled by the vehicle 100. The grade of a road may be expressed in degrees and may be a measure of the decline or incline associated with the road. The vehicle monitoring module 220 may determine the current grade of the road using a variety of methods. In one embodiment, the vehicle monitoring module 220 may determine the grade of the road using an accelerometer of the vehicle sensors 121. For example, the accelerometer may be a three-axis accelerometer and the vehicle monitoring module 220 may determine the grade of the road according to the different acceleration values provided by each axis of the accelerometer.

In another embodiment, the vehicle monitoring module 220 may determine the grade of the road by comparing the actual acceleration of the vehicle 100 with the expected acceleration of the vehicle 100. The expected acceleration of the vehicle 100 is what the acceleration of the vehicle 100 would be on a flat road (i.e., 0 degrees road grade) given the current amount of throttle being applied. The vehicle monitoring module 220 may determine the current amount of throttle being applied from the throttle system 144 of the vehicle systems 140. A difference between the expected acceleration and the actual acceleration can be used by the vehicle monitoring module 220 to calculate the road grade.

In another embodiment, the vehicle monitoring module 220 may determine the grade using a terrain map 117 associated with map data 116. For example, the terrain map 117 may indicate the road grade for a variety of locations. The vehicle monitoring module 220 may determine the current location of the vehicle 100 from the navigation system 147 and may use the current location to determine the road grade from the terrain map 117, for example.

The vehicle monitoring module 220 is configured to determine a mass of the vehicle 100. As may be appreciated, the mass of the vehicle 100 may change depending on the number of passengers in the vehicle 100, any cargo placed on or in the vehicle 100, and any trailer or other apparatus currently being towed by the vehicle 100. In some embodiments, the vehicle monitoring module 220 may determine the mass of the vehicle 100 after accelerating from a complete stop. When the vehicle 100 accelerates from a complete stop, the vehicle monitoring module 220 may determine the acceleration observed by the vehicle 100 and the amount of force that was applied to the vehicle 100. The vehicle monitoring module 220 may then determine the mass of the vehicle 100 according to the force and the acceleration (e.g., using the equation Force=Mass×Acceleration). The vehicle monitoring module 220 may determine the acceleration of the vehicle 100 from the accelerator of the vehicle sensors 121. The vehicle monitoring module 220 may determine the force applied to the vehicle 100 from the throttle system 144.

The vehicle monitoring module 220 is further configured to determine an engine speed of the vehicle 100. The engine speed of the vehicle 100 may be measured in rotations per minute (RPM) and may be a measure of how fast the engine is spinning. The vehicle monitoring module 220 may determine the engine speed from the vehicle systems 140, for example. Other methods for determining engine speed may be used.

The downshift module 225 may be configured to determine when to downshift the transmission of the vehicle 100 to a lower gear to increase engine braking. The downshift module 225 may cause the transmission of the vehicle to downshift the transmission of the vehicle 100 to a lower gear by sending an instruction to the transmission system 105. The transmission system 145 may then downshift the transmission to a lower gear in response to the instruction.

The downshift module 225 may be configured to determine a road grade threshold 285, and to determine to downshift the transmission from a current gear when the current grade of the road exceeds the road grade threshold 285. The downshift module 225 may receive the current grade of the road from the vehicle monitoring module 220. Depending on the embodiment, the downshift module 225 may determine a road grade threshold for the current gear or may determine a road grade threshold 285 for each gear of the transmission.

The downshift module 225 may determine the road grade threshold 285 for a gear using the current velocity and brake pressure of the vehicle 100 as provided by the vehicle monitoring module 220. In one implementation, the downshift module 225 may use the current velocity and brake pressure and a downshift table 280. The downshift table 280 may be a mapping of velocities and brake pressure values to road grade thresholds 285. Depending on the embodiment, each gear of the transmission may have an associated downshift table 280, and the downshift module 225 may use the downshift table 280 corresponding to each gear when determining the road grade thresholds for the gears.

The road grades and corresponding velocity and brake pressure values in the downshift table 280 may have been determined experimentally for the vehicle 100 such that any engine braking resulting from a downshift will keep the velocity of the vehicle 100 constant in view of the current brake pressure and road grade. The greater the velocity and brake pressure, the lower the road grade threshold 285 in the downshift table 280.

In some embodiments, the downshift module 225 may determine the road grade threshold 285 for a gear using the current velocity, brake pressure, and the mass of the vehicle 100. In such an embodiment, the downshift table 280 may be a mapping of velocities, brake pressure values, and mass values to road grade thresholds 285. Similarly, as described above, the greater the mass of the vehicle 100, the lower the road grade threshold 285 in the downshift table 280.

The upshift module 230 is configured to determine when to upshift the transmission of the vehicle 100 to a higher gear to reduce engine braking. The upshift module 230 may cause the transmission of the vehicle to upshift the transmission of the vehicle 100 to a higher gear by sending an instruction to the transmission system 145. The transmission system 145 may then upshift the transmission to a higher gear in response to the instruction.

The upshift module 230 may be configured to determine to upshift the transmission when the grade of the road goes below the road grade threshold 285 for the current gear. The road grade threshold 285 may be the road grade threshold 285 calculated for the gear by the downshift module 225. The upshift module 230 may receive the current grade of the road from the vehicle monitoring module 220.

In some embodiments, to avoid upshifting when the grade of the road is only temporarily below the road grade threshold 285, the upshift module 230 may determine to upshift from the current gear when the current grade of the road is above the road grade threshold 285 for an amount of time that is more than a road grade timer 290. If the current grade of the road remains above the road grade threshold 285 for the gear for an amount time that is greater than the road grade timer 290, the upshift module 230 may upshift to a gear that is above the current gear by sending an instruction to the transmission system 145. Else, the upshift module 230 may determine to remain in the current gear and may continue to monitor the grade of the road.

In some embodiments, the road grade timer 290 may be a fixed duration that is set by a user or administrator. For example, the road grade timer 290 may be two seconds, three seconds, four seconds, or five seconds. Other times may be used.

In other embodiments, the road grade timer 290 may be dynamic and may be based on data such as the current road grade. For example, the road grade timer 290 may be proportional to the current road grade. Accordingly, the smaller the current road grade the smaller road grade timer 290 used by the upshift module 230, and vice versa.

The upshift module 230 is further configured to determine to upshift the transmission from the current gear in response to throttle being applied by the throttle system 144. In some embodiments, the throttle system 144 applies throttle to the vehicle 100 in response to a driver associated with the vehicle pressing or actuating the accelerator pedal (or other interface) associated with the vehicle 100. Applying throttle by the driver (or an autonomous driving module 160) may indicate that engine braking is no longer desired. Accordingly, when the upshift module 230 detects that throttle has been applied by the throttle system 144, the upshift module 230 upshifts to a gear that is above the current gear by sending an instruction to the transmission system 145.

In some embodiments, to avoid upshifting in response to an errant or accidental application of throttle, the upshift module 230 determines to upshift from the current gear when the throttle is applied for more than a throttle timer 291. If the throttle is applied for an amount of time that exceeds the throttle timer, the upshift module 230 upshifts to a gear that is above the current gear by sending an instruction to the transmission system 145. Else, the upshift module 230 determines to remain in the current gear and continues to monitor the grade of the road.

In some embodiments, the throttle timer 291 may be a fixed duration that is set by a user or administrator. For example, the throttle timer 291 may be the same as the road grade timer 290. Any amount of time may be used for the throttle timer 291.

In other embodiments, the throttle timer 291 may be dynamic and may be set by the upshift module 230 based on data such as the current road grade. The throttle timer 291 may be proportional to the current road grade. Accordingly, the smaller the current road grade the smaller the throttle timer 291 used by the upshift module 230, and vice versa.

The throttle timer 291 may be set by the upshift module 230 based on the engine speed of the vehicle 100. The throttle timer 291 may be inversely proportional to the current engine speed. Accordingly, the higher the engine speed the smaller the throttle timer 291 used by the upshift module 230, and vice versa. The upshift module 230 may receive the current engine speed from the vehicle monitoring module 220.

Figure 3:
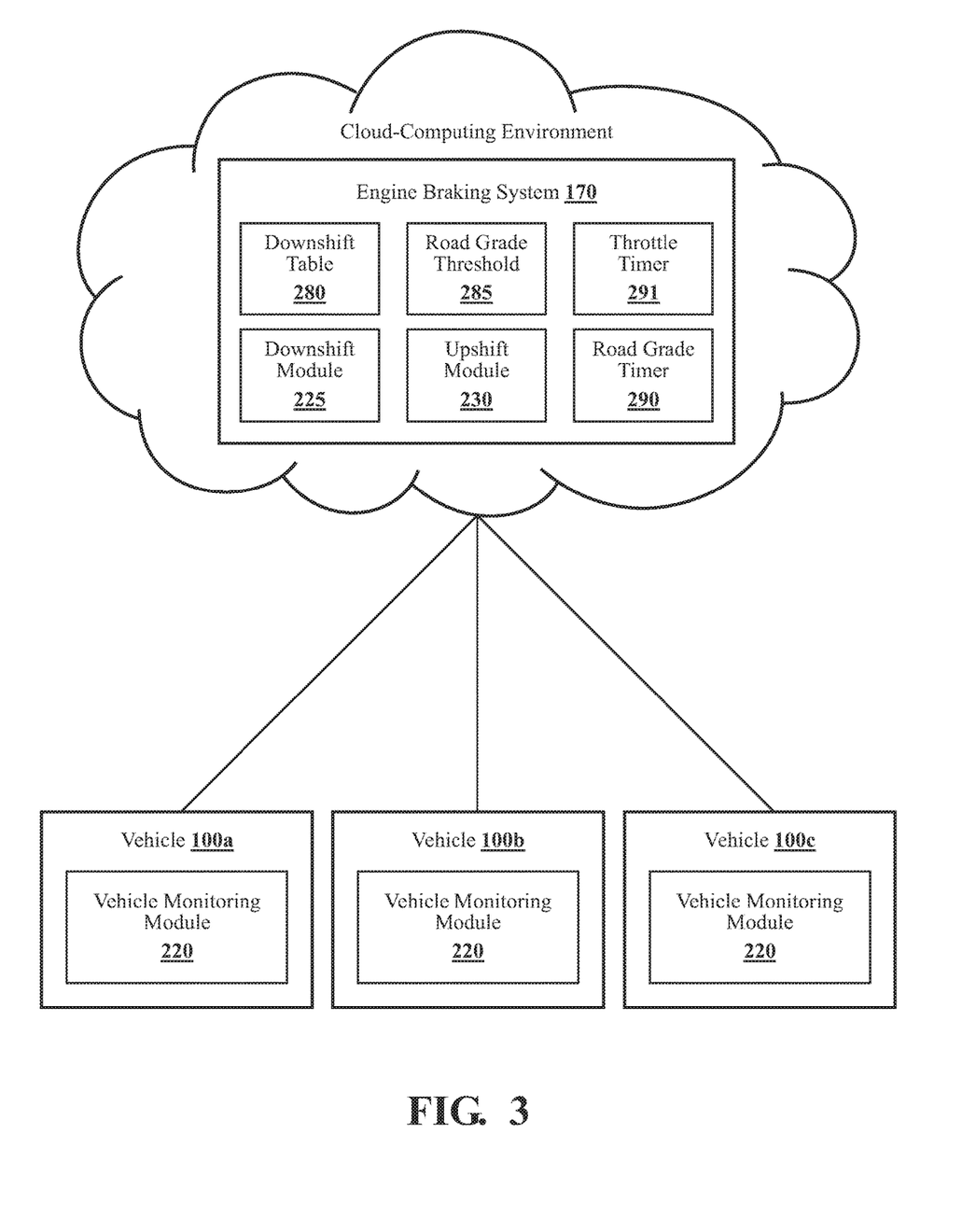
FIG. 3 illustrates one embodiment of the engine braking system using a cloud-computing environment.

With reference to FIG. 3, another embodiment of the engine braking system 170 of FIG. 1 is further illustrated. The engine braking system 170 is implemented using a cloud-computing environment. In particular, the downshift module 225, upshift module 230, downshift table 280, road grade threshold 285, road grade timer 290, and throttle timer 291 are implemented or stored using the cloud-computing environment.

The engine braking system 170 may be in communication with a plurality of vehicles 100 (i.e., the vehicles 100*a*, 100*b*, and 100*c*) through a network or other communication means. While only three vehicles 100 are shown, it is for illustrative purposes only; there is no limit to the number of vehicles 100 that may be supported. The vehicles 100 may be autonomous vehicles or may be non-autonomous vehicles under the control of a driver, for example.

In the embodiment shown, each vehicle 100 includes its own vehicle monitoring module 220. In other embodiments, each vehicle 100 may also include one or more of the downshift module 225, upshift module 230, downshift table 280, road grade threshold 285, road grade timer 290, and throttle timer 291.

The engine braking system 170 may be configured to determine, for each vehicle 100, when to increase or decrease engine braking for the vehicle 100. In one embodiment, for each vehicle 100, the vehicle monitoring module 220 associated with the vehicle may be configured to send data such as the current road grade, velocity, brake pressure, and mass to the engine braking system 170. The data may be sent using a network or other communication means between each vehicle 100 and the engine braking system 170. The data may also include the current engine speed of the vehicle 100, and whether any throttle is being applied by the throttle system 144 to the vehicle 100.

The downshift module 225 is configured, for each vehicle 100, to determine a road grade threshold 285 for each gear of the vehicle transmission. The downshift module 225 may determine the road grade thresholds 285 for a vehicle 100 using the downshift table 280 and the current velocity and brake pressure received from the vehicle monitoring module 220 associated with the vehicle 100.

The downshift module 225 is configured, for each vehicle 100, to determine if the current road grade of the vehicle 100 is greater than the road grade threshold 285 of the current gear used by the vehicle 100. The downshift module 225 may cause each vehicle 100 with a current road grade that is greater than the road grade threshold to downshift to a lower gear. For example, the downshift module 225 may send an instruction or control signal to the transmission system 145 of each vehicle 100 to downshift to a lower gear. The instructions may be sent by the downshift module 225 using the network or other communication means between each vehicle 100 and the engine braking system 170.

The upshift module 230 is configured, for each vehicle 100, to determine one or both of a road grade timer 290 and a throttle timer 291. The upshift module 230 may determine the road grade timer 290 for a vehicle 100 based on the current road grade of the vehicle 100. The upshift module 230 may determine the throttle timer 291 for a vehicle 100 based on the current engine speed of the vehicle 100. The upshift module 230 may use the current road grades and engine speeds provided by the vehicle monitoring module 220 associated with each vehicle 100.

The upshift module 230 is configured, for each vehicle 100, to determine if the current road grade of the vehicle 100 has fallen below the road grade threshold 285 for the current gear for an amount of time that exceeds the road grade timer 290 for the vehicle 100. The upshift module 230 may cause each vehicle 100 with a current road grade that has fallen below the road grade threshold 285 for an amount of time that exceeds the road grade timer 290 to upshift to a higher gear. For example, the upshift module 230 may send an instruction or control signal to the transmission system 145 of each vehicle 100 to upshift to a higher gear. The instructions may be sent by the upshift module 230 using the network or other communication means between each vehicle 100 and the engine braking system 170.

The upshift module 230 may be further configured, for each vehicle 100, to determine if the throttle of the vehicle 100 has been applied for an amount of time that exceeds the throttle timer 291 for the vehicle 100. The upshift module 230 may cause each vehicle 100 with throttle that was applied for an amount of time that exceeds the throttle timer 291 to upshift to a higher gear. For example, the upshift module 230 may send an instruction of control signal to the transmission system 145 of each vehicle 100 to upshift to a higher gear.

Figure 4:
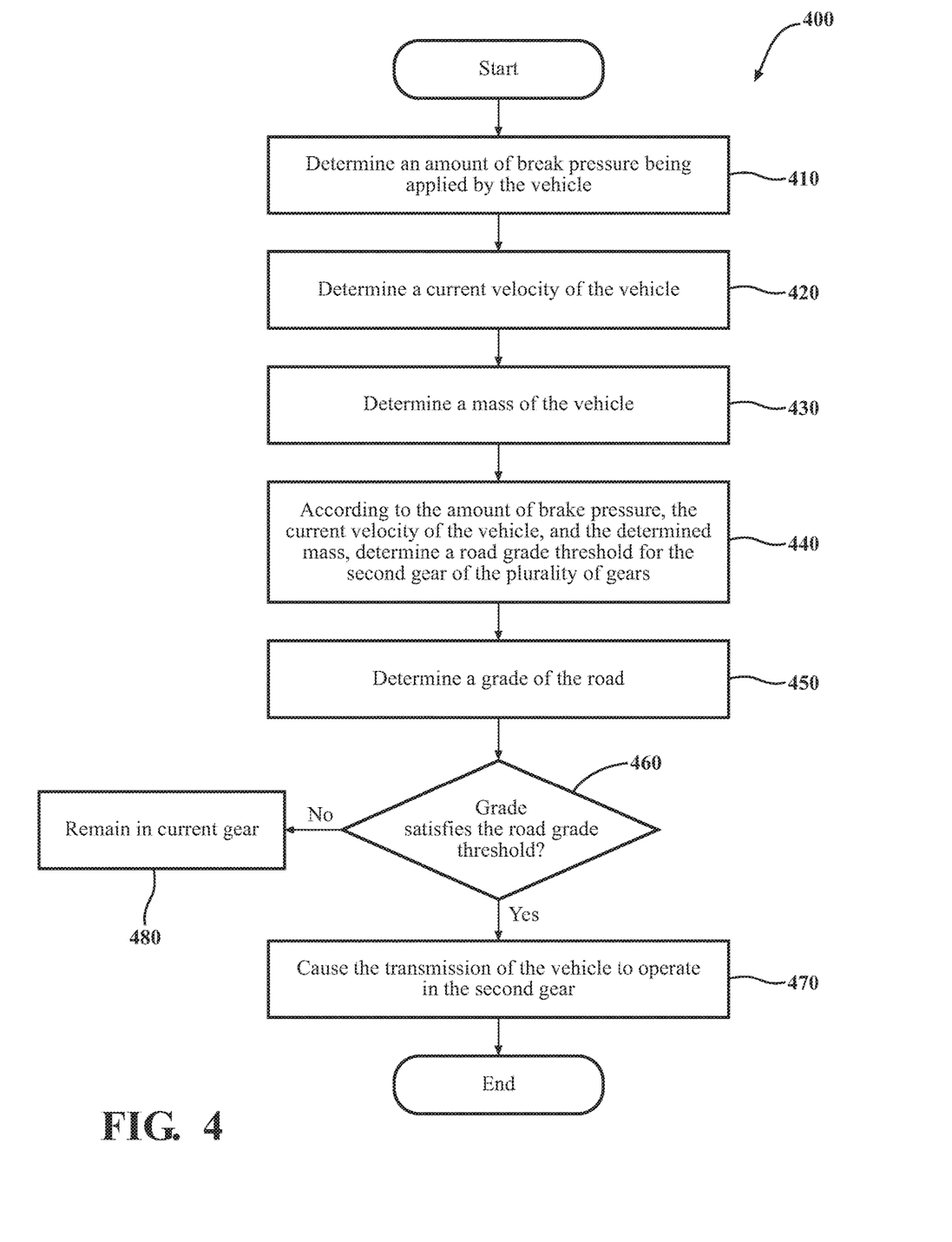
FIG. 4 illustrates a flowchart of a method that is associated with determining when to downshift a vehicle to increase engine braking.

Additional aspects of controlling engine braking in a vehicle 100 will be discussed in relation to FIG. 4. FIG. 4 illustrates a flowchart of a method 400 that is associated with determining when to downshift a vehicle 100 to increase engine braking. The method 400 will be discussed from the perspective of the engine braking system 170 of FIGS. 1, 2, and 3. While the method 400 is discussed in combination with the engine braking system 170, it should be appreciated that the method 400 is not limited to being implemented within the engine braking system 170 but is instead one example of a system that may implement the method 400.

At 410, the vehicle monitoring module 220 determines an amount of brake pressure being applied by the vehicle 100. The vehicle 100 may be traveling on a road and a transmission of the vehicle may be operating in a first gear of a plurality of gears. In one embodiment, the vehicle monitoring module 220 may determine the amount of brake pressure by communicating with one or more vehicle systems 140 such as the braking system 142, for example. Other methods for determining brake pressure may be used.

At 420, the vehicle monitoring module 220 determines a current velocity of the vehicle 100. In one embodiment, the vehicle monitoring module 220 may determine the current velocity of the vehicle 100 by communicating with one or more vehicle systems 140 such as the throttle system 144 and the navigation system 147. Other methods for determining the current velocity of the vehicle 100 may be used.

At 430, the vehicle monitoring module 220 determines a mass of the vehicle 100. In one embodiment, the vehicle monitoring module 220 may determine the mass of the vehicle 100 when the vehicle 100 accelerates from a complete stop. For example, the vehicle monitoring module 220 may calculate the mass of the vehicle from the amount of force applied to the vehicle 100 and the acceleration of the vehicle 100. Other methods for determining the mass of the vehicle 100 may be used.

At 440, the vehicle monitoring module 220 determines a road grade threshold for a second gear of the plurality of gears. The second gear may be a lower gear than the first gear (i.e., a gear with a lower gear ratio). The vehicle monitoring module 220 may determine the road grade threshold for the second gear using some or all of the current velocity, the amount of brake pressure, the mass value, and a downshift table 280. For example, the downshift table 280 may include different road grade thresholds for different combinations of velocities, mass values, and brake pressures for the vehicle 100.

At 450, the vehicle monitoring module 220 determines a grade for the road that the vehicle 100 is traveling on. In one embodiment, the vehicle monitoring module 220 may determine the road grade using one or more accelerometers of the sensor system 120 of the vehicle 100. Other methods for determining road grade may be used.

Figure 7:
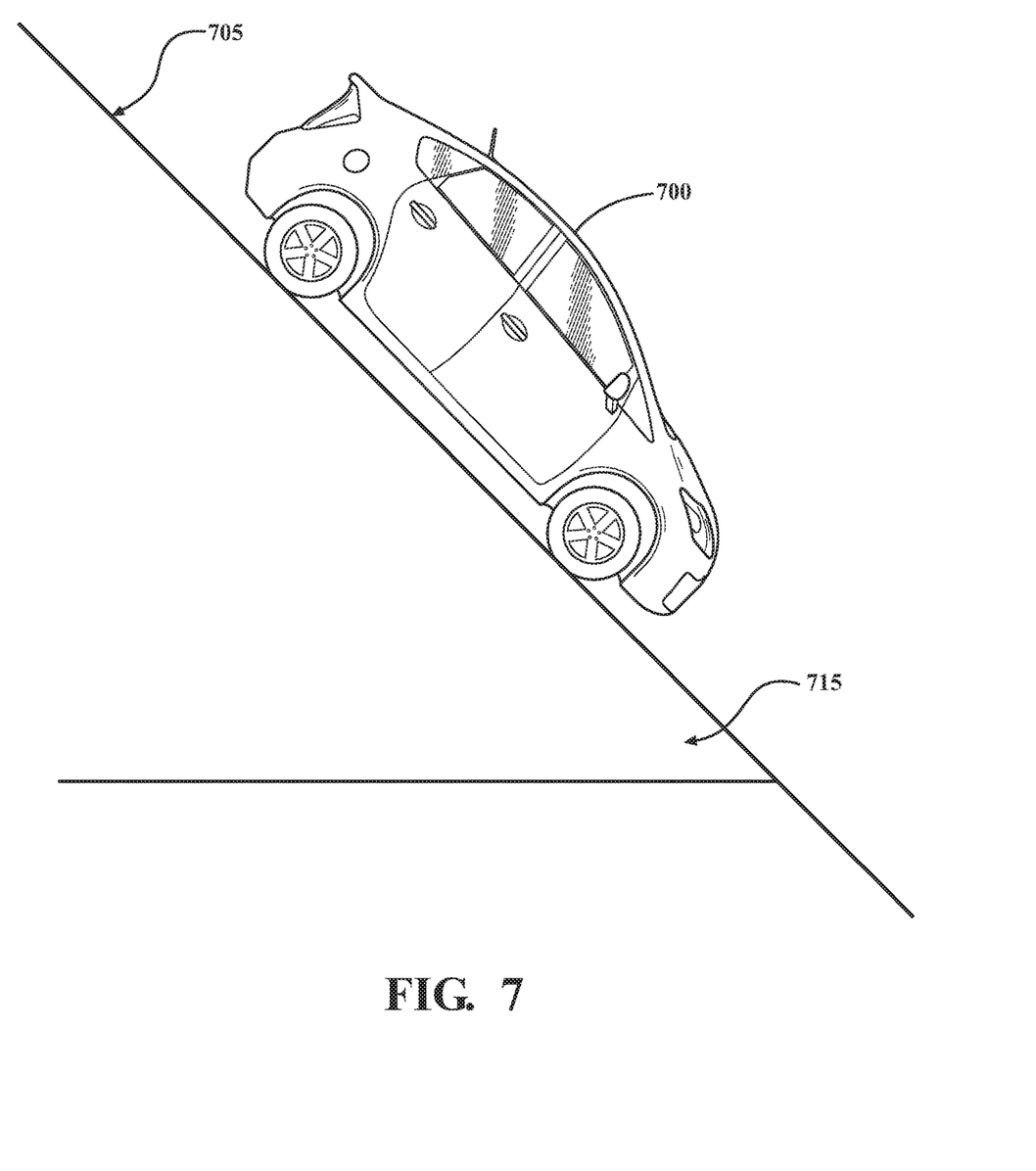
FIG. 7 illustrates a vehicle using engine braking.

For example, FIG. 7 is an illustration of a vehicle 700 traveling on a road 705. The vehicle monitoring module 220 may determine a grade 715 of the road 705 which is shown as the angle between the road 705 and a horizontal line.

At 460, the downshift module 225 determines if the grade of the road satisfies the road grade threshold. The grade of road may satisfy the road grade threshold 285 when it is greater than the road grade threshold 285. If the grade satisfies the road grade threshold, the method 400 may continue at 470. Else the method 400 may continue at 480.

At 470, the downshift module 225 may cause the transmission of the vehicle to operate in the second gear. In some embodiments, the downshift module 225 may cause the vehicle 100 to operate in the second gear by sending an instruction or signal to the transmission system 145 to downshift to the second gear. Other methods may be used.

At 480, the downshift module 225 determines to remain in the current gear.

Figure 5:
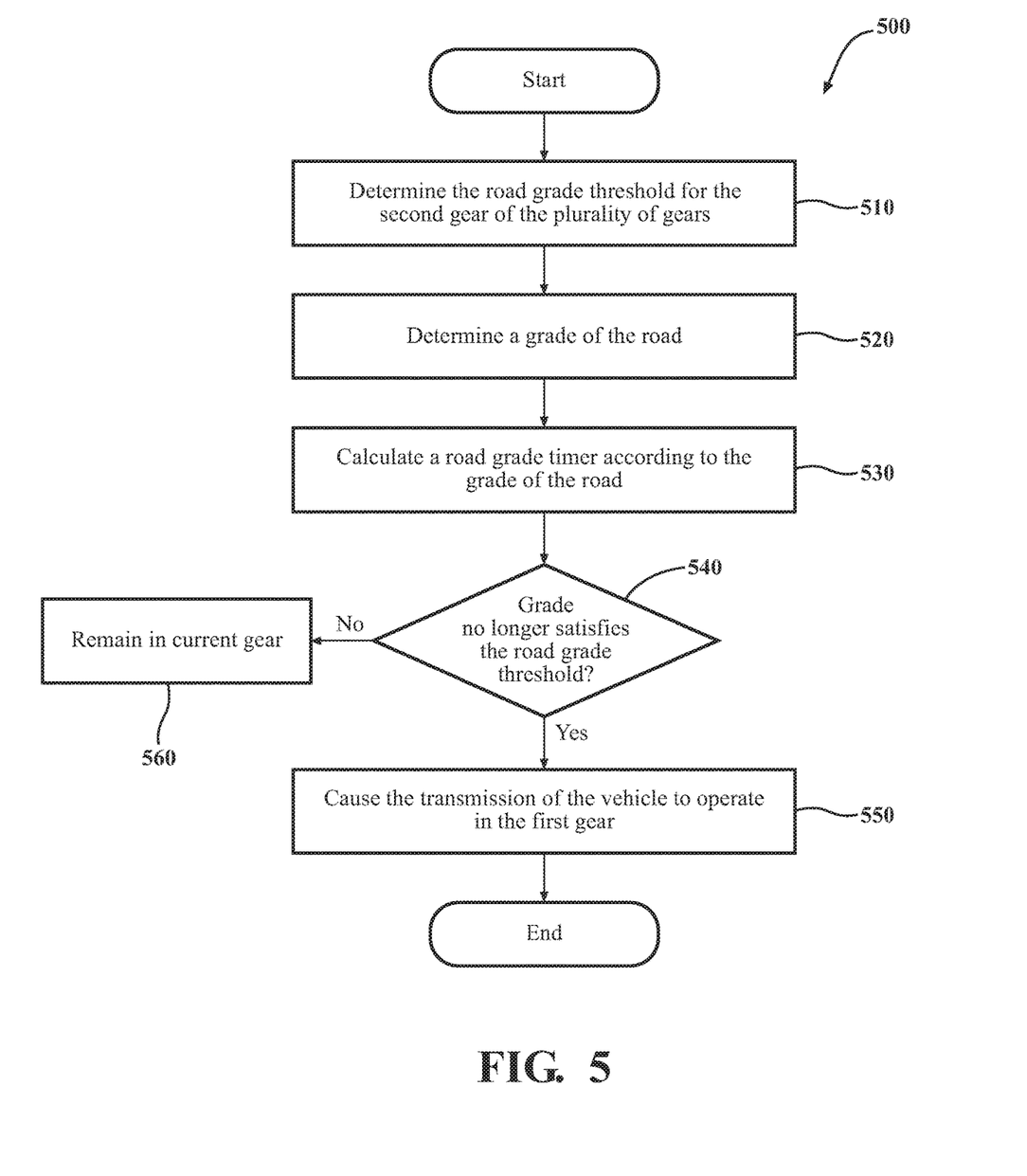
FIG. 5 illustrates a flowchart of a method that is associated with determining when to upshift a vehicle to decrease engine braking.

Additional aspects of controlling engine braking in a vehicle 100 will be discussed in relation to FIG. 5. FIG. 5 illustrates a flowchart of a method 500 that is associated with determining when to upshift a vehicle 100 to decrease engine braking. The method 500 will be discussed from the perspective of the engine braking system 170 of FIGS. 1, 2, and 3. While the method 500 is discussed in combination with the engine braking system 170, it should be appreciated that the method 500 is not limited to being implemented within the engine braking system 170 but is instead one example of a system that may implement the method 500.

At 510, the upshift module 230 determines the road grade threshold for the second gear of the plurality of gears of the transmission of the vehicle 100. The transmission of the vehicle 100 may be operating in the second gear. The road grade threshold 285 may be the same as the road grade threshold 285 determined for the second gear by the downshift module 225 in the method 400.

At 520, the vehicle monitoring module 220 determines a grade for the road that the vehicle 100 is traveling on. In one embodiment, the vehicle monitoring module 220 may determine the road grade using one or more accelerometers of the sensor system 120 of the vehicle 100. Other methods for determining road grade may be used.

At 530, the upshift module 230 calculates a road grade timer 290 based on the determined grade for the road. In some implementations, the upshift module 230 may calculate the road grade timer 290 such that the duration or length of the road grade timer 290 is proportional to the determined grade of the road.

At 540, the upshift module 230 determines if the grade of the road no longer satisfies the road grade threshold 285 for the second gear for an amount of time that exceeds the road grade timer 290. The grade of the road does not satisfy the road grade threshold 285 when it is less than the road grade threshold 285. If the grade of the road no longer satisfies the road grade threshold, the method 500 may continue at 550. Else the method 500 may continue at 560.

At 550, the upshift module 230 may cause the transmission of the vehicle 100 to operate in the first gear. In some embodiments, the upshift module 225 may cause the vehicle 100 to operate in the first gear by sending an instruction or control signal to the transmission system 145 to upshift to the first gear. Other methods may be used.

At 560, the upshift module 225 determines to remain in the current gear.

Figure 6:
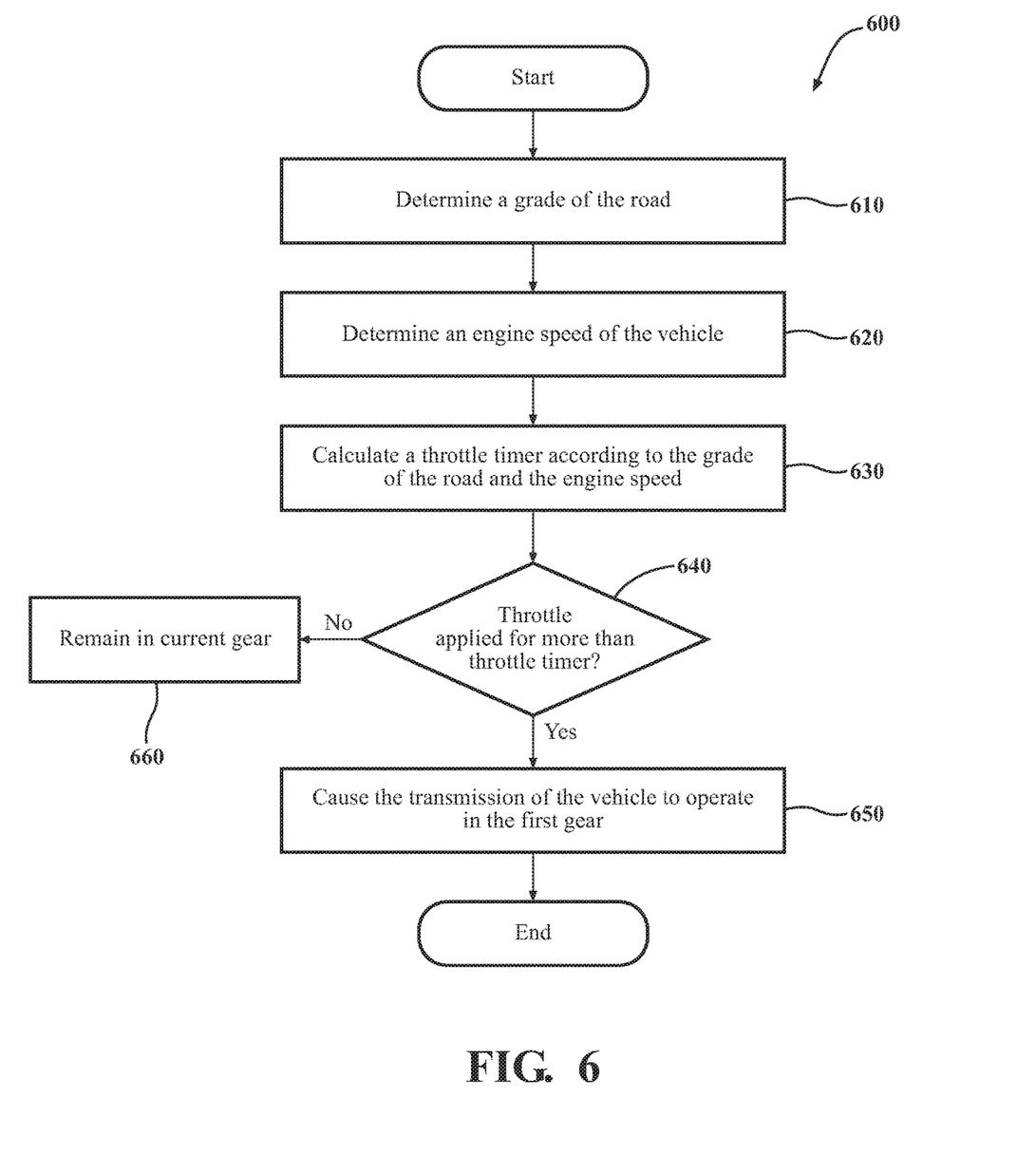
FIG. 6 illustrates a flowchart of a method that is associated with determining when to upshift a vehicle to decrease engine braking.

Additional aspects of controlling engine braking in a vehicle 100 will be discussed in relation to FIG. 6. FIG. 6 illustrates a flowchart of a method 600 that is associated with determining when to upshift a vehicle 100 to decrease engine braking. The method 600 will be discussed from the perspective of the engine braking system 170 of FIGS. 1, 2, and 3. While the method 600 is discussed in combination with the engine braking system 170, it should be appreciated that the method 600 is not limited to being implemented within the engine braking system 170 but is instead one example of a system that may implement the method 600.

At 610, the vehicle monitoring module 220 determines a grade for the road that the vehicle 100 is traveling on. In one embodiment, the vehicle monitoring module 220 may determine the grade using one or more accelerometers of the sensor system 120 of the vehicle 100. Other methods for determining the grade of a road may be used.

At 620, the vehicle monitoring module 220 determines an engine speed for the vehicle 100. In one embodiment, the vehicle monitoring module 220 may determine the engine speed from one or more of the vehicle systems 140 such as the transmission system 145 or the throttle system 144, for example. Other methods for determining engine speed may be used.

At 630, the upshift module 230 calculates a throttle timer 291 based on one or both of the determined grade for the road and the current engine speed. In some embodiments, the upshift module 230 may calculate the throttle timer 291 such that the duration or length of the throttle timer 291 is proportional to the determined grade of the road, and inversely proportional to the engine speed of the vehicle 100.

At 640, the upshift module 230 determines if throttle has been applied to the vehicle 100 for an amount of time that exceeds the throttle timer 291. The upshift module 230 may determine that the throttle has been applied to the vehicle 100 based on information received from the throttle system 144 of the vehicle systems 140, for example. If the throttle is applied for more than the throttle timer, the method 600 may continue at 650. Else the method 600 may continue at 660.

At 650, the upshift module 230 may cause the transmission of the vehicle to operate in the first gear. In some embodiments, the upshift module 225 may cause the vehicle 100 to operate in the first gear by sending an instruction or control signal to the transmission system 145 to upshift to the first gear. Other methods may be used.

At 660, the upshift module 230 determines to remain in the current gear.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the engine braking system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the engine braking system 170, and/or the autonomous driving module(s) 160 may control some or all of these vehicle systems 140 and, thus, may be partially or fully autonomous.

The processor(s) 110, the engine braking system 170, and/or the autonomous driving module(s) 160 can be operatively connected to communicate with the various vehicle systems 140 and/or individual components thereof. For example, returning to FIG. 1, the processor(s) 110, the engine braking system 170, and/or the autonomous driving module(s) 160 can be in communication to send and/or receive information from the various vehicle systems 140 to control the movement, speed, maneuvering, heading, direction, etc. of the vehicle 100. The processor(s) 110, the engine braking system 170, and/or the autonomous driving module(s) 160 may control some or all of these vehicle systems 140.

The processor(s) 110, the engine braking system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the engine braking system 170, and/or the autonomous driving module(s) 160 can control the direction and/or speed of the vehicle 100. The processor(s) 110, the engine braking system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the engine braking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An engine braking system for controlling engine braking, comprising:
   one or more processors;
   a memory communicably coupled to the one or more processors and storing:
      a vehicle monitoring module including instructions that when executed by the one or more processors cause the one or more processors to:
         determine an amount of brake pressure being applied by a vehicle traveling on a road;
         determine a current velocity of the vehicle, wherein a transmission of the vehicle is operating using a first gear of a plurality of gears; and
         determine a grade of the road; and
      a downshift module including instructions that when executed by the one or more processors cause the one or more processors to:
         determine a road grade threshold for a second gear of the plurality of gears based on at least the amount of brake pressure and the current velocity of the vehicle; and
         in response to a determination that the grade of the road satisfies the road grade threshold for the second gear, generate a control signal to cause the transmission of the vehicle to operate using the second gear.

2. The engine braking system of claim 1, wherein the second gear is a lower gear than the first gear.

3. The engine braking system of claim 1, the vehicle monitoring module further including instructions that when executed by the one or more processors cause the one or more processors to:
   determine a mass of the vehicle; and
   based on the amount of brake pressure, the current velocity of the vehicle, and the determined mass, determine the road grade threshold for the second gear of the plurality of gears.

4. The engine braking system of claim 1, wherein the instructions that cause the one or more processors to determine the grade of the road further comprise instructions that cause the one or more processors to:
   determine an actual acceleration of the vehicle;
   determine an expected acceleration of the vehicle; and
   determine the grade of the road according to the actual acceleration and the expected acceleration.

5. The engine braking system of claim 1, further comprising an upshift module including instructions that when executed by the one or more processors cause the one or more processors to:
   in response to the grade failing to satisfy the road grade threshold for an amount of time that exceeds a road grade timer, generate a control signal to cause the transmission of the vehicle to operate in the first gear of the plurality of gears.

6. The engine braking system of claim 5, wherein the upshift module further includes instructions to calculate the road grade timer based on the grade of the road.

7. An engine braking system for controlling engine braking, comprising:
   one or more processors;
   a memory communicably coupled to the one or more processors and storing:
      a vehicle monitoring module including instructions that when executed by the one or more processors cause the one or more processors to:
         determine an amount of brake pressure being applied by a vehicle traveling on a road;
         determine a current velocity of the vehicle, wherein a transmission of the vehicle is operating using a first gear of a plurality of gears; and
         determine a grade of the road;
      a downshift module including instructions that when executed by the one or more processors cause the one or more processors to:
         according to the amount of brake pressure and the current velocity of the vehicle, determine a road grade threshold for a second gear of the plurality of gears; and
         in response to a determination that the grade satisfies the road grade threshold for the second gear, generate a control signal to cause the transmission of the vehicle to operate using the second gear; and
      an upshift module including instructions that when executed by the one or more processors cause the one or more processors to:
         in response to a determination that throttle has been applied to the vehicle for an amount of time that exceeds a throttle timer, generate a control signal to cause the transmission of the vehicle to operate in the first gear of the plurality of gears.

8. A method for controlling engine braking, the method comprising:
   determining an amount of brake pressure being applied by a vehicle traveling on a road;
   determining a current velocity of the vehicle, wherein a transmission of the vehicle is operating using a first gear of a plurality of gears;
   determining a road grade threshold for a second gear of the plurality of gears based on at least the amount of brake pressure and the current velocity of the vehicle;
   determining a grade of the road; and
   in response to a determination that the determined grade of the road satisfies the road grade threshold for the second gear of the vehicle, generating a control signal to cause the transmission of the vehicle to operate in the second gear of the plurality of gears.

9. The method of claim 8, wherein the second gear is a lower gear than the first gear.

10. The method of claim 8, further comprising:
determining a mass of the vehicle; and
according to the amount of brake pressure, the current velocity of the vehicle, and the determined mass, determining the road grade threshold for the second gear of the plurality of gears.

11. The method of claim 8, wherein determining the grade of the road comprises:
determining an actual acceleration of the vehicle;
determining an expected acceleration of the vehicle; and
determining the grade of the road according to the actual acceleration and the expected acceleration.

12. The method of claim 8, further comprising:
in response to a determination that the grade of the road fails to satisfy the road grade threshold for an amount of time that exceeds a road grade timer, generating a control signal to cause the transmission of the vehicle to operate in the first gear of the plurality of gears.

13. The method of claim 12, further comprising calculating the road grade timer according to the grade of the road.

14. The method of claim 8, further comprising:
in response to a determination that throttle has been applied to the vehicle for an amount of time that exceeds a throttle timer, generating a control signal to cause the transmission of the vehicle to operate in the first gear of the plurality of gears.

15. The method of claim 14, further comprising calculating the throttle timer according to the grade of the road and an engine speed of the vehicle.

16. A non-transitory computer-readable medium for controlling engine braking and including instructions that when executed by one or more processors cause the one or more processors to:
determine an amount of brake pressure being applied by a vehicle traveling on a road;
determine a current velocity of the vehicle, wherein a transmission of the vehicle is operating using a first gear of a plurality of gears;
determine a road grade threshold for a second gear of the plurality of gears based on at least the amount of brake pressure and the current velocity of the vehicle;
determine a grade of the road; and
in response to a determination that the determined grade of the road satisfies the road grade threshold for the second gear of the vehicle, generate a control signal to cause the transmission of the vehicle to operate in the second gear of the plurality of gears.

17. The non-transitory computer-readable medium of claim 16, wherein the second gear is a lower gear than the first gear.

18. The non-transitory computer-readable medium of claim 16, further including instructions that when executed by the one or more processors cause the one or more processors to:
determine a mass of the vehicle; and
according to the amount of brake pressure, the current velocity of the vehicle, and the determined mass, determine the road grade threshold for the second gear of the plurality of gears.

19. The non-transitory computer-readable medium of claim 16, wherein the instructions that when executed by the one or more processors cause the one or more processors to determine the grade of the road further comprise instructions that when executed by the one or more processors cause the one or more processors to:
determine an actual acceleration of the vehicle;
determine an expected acceleration of the vehicle; and
determine the grade of the road according to the actual acceleration and the expected acceleration.

20. The non-transitory computer-readable medium of claim 16, further including instructions that when executed by the one or more processors cause the one or more processors to:
in response to a determination that the grade of the road fails to satisfy the road grade threshold for an amount of time that exceeds a road grade timer, generate a control signal to cause the transmission of the vehicle to operate in the first gear of the plurality of gears.

* * * * *